United States Patent
Lee et al.

(10) Patent No.: US 10,558,205 B2
(45) Date of Patent: Feb. 11, 2020

(54) ROBOTIC SYSTEM AND METHOD WITH POSITION DETECTION FOR TRANSFERRING VEHICLE COMPONENT

(71) Applicants: Hyundai Motor Company, Seoul (KR); Kia Motors Corporation, Seoul (KR)

(72) Inventors: Junkyoung Lee, Gyeonggi-do (KR); Hyun Gu Lee, Ulsan (KR); Yoon Jang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 138 days.

(21) Appl. No.: 15/624,610

(22) Filed: Jun. 15, 2017

(65) Prior Publication Data
US 2018/0173208 A1   Jun. 21, 2018

(30) Foreign Application Priority Data

Dec. 16, 2016   (KR) .................. 10-2016-0172617

(51) Int. Cl.
*G05B 19/418* (2006.01)
*B25J 9/16* (2006.01)

(52) U.S. Cl.
CPC ........ *G05B 19/4189* (2013.01); *B25J 9/1687* (2013.01); *G05B 2219/45054* (2013.01); *G05B 2219/45064* (2013.01)

(58) Field of Classification Search
None
See application file for complete search history.

(56) References Cited

U.S. PATENT DOCUMENTS

| 5,184,766 A * | 2/1993 | Takahashi ............ B23K 37/047 228/4.1 |
| 5,216,800 A * | 6/1993 | Nishigori ............... B62D 65/06 29/712 |
| 6,193,142 B1 * | 2/2001 | Segawa ................ B23K 37/047 219/148 |
| 7,708,517 B2 | 5/2010 | Nakamura et al. |

(Continued)

FOREIGN PATENT DOCUMENTS

| JP | 2005-271130 | 10/2005 |
| JP | 2011-121405 A | 6/2011 |

(Continued)

*Primary Examiner* — Bernard G Lindsay
(74) *Attorney, Agent, or Firm* — Mintz Levin Cohn Ferris Glovsky and Popeo, P.C.; Peter F. Corless

(57) ABSTRACT

A robot transferring system of a component and a transferring method thereof are provided. The robot transferring system of a component includes a hanger in which components including at least one of a cowl plate, a roof rail, and a package tray are disposed. A first sensor detects a reference position of the components disposed in the hanger to detect a shape of the component and a first loading robot capture each component based on a predetermined position determined by the sensor. A first loading jig is disposed at a location in which one of the components captured by the loading robot is disposed and a setting robot transfers the components disposed in the loading jig to a vehicle body to dispose the component to a predetermined position of the vehicle body.

12 Claims, 7 Drawing Sheets

(56) References Cited

U.S. PATENT DOCUMENTS

| | | | | |
|---|---|---|---|---|
| 2002/0014008 | A1* | 2/2002 | Sato | B23K 26/0838 29/897.2 |
| 2003/0057256 | A1* | 3/2003 | Nakamura | B62D 65/02 228/49.1 |
| 2007/0039155 | A1* | 2/2007 | Savoy | B62D 65/06 29/407.1 |
| 2010/0287767 | A1* | 11/2010 | Woo | B23P 21/004 29/823 |
| 2011/0048649 | A1* | 3/2011 | Komatsu | B23P 19/069 157/1.35 |
| 2013/0145616 | A1* | 6/2013 | Jang | B62D 65/026 29/822 |
| 2013/0211766 | A1* | 8/2013 | Rosenberg | G01B 21/042 702/97 |
| 2013/0212858 | A1* | 8/2013 | Herzinger | F16B 5/0642 29/428 |
| 2014/0165388 | A1* | 6/2014 | Kim | B25J 15/0061 29/823 |
| 2016/0121950 | A1* | 5/2016 | Werling | B60R 13/04 296/191 |
| 2017/0029053 | A1* | 2/2017 | Ishitsuka | B62D 65/022 |

FOREIGN PATENT DOCUMENTS

| | | |
|---|---|---|
| KR | 10-0887970 B1 | 3/2009 |
| KR | 10-2013-0063928 A | 6/2013 |
| KR | 10-2014-0102524 | 8/2014 |

\* cited by examiner

ROBOTIC SYSTEM AND METHOD WITH POSITION DETECTION FOR TRANSFERRING VEHICLE COMPONENT

CROSS-REFERENCE TO RELATED APPLICATION

This application claims priority to and the benefit of Korean Patent Application No. 10-2016-0172617 filed in the Korean Intellectual Property Office on Dec. 16, 2016, the entire contents of which are incorporated herein by reference.

BACKGROUND (a) Field of the Invention

The present invention relates to a robot transferring system of a component which disposes a cowl plate, a roof rail, and a package tray at a predetermined position of a vehicle body and a transferring method thereof.

(b) Description of the Related Art

A vehicle body includes vehicle body components such as a floor panel that supports an engine and a driver such as a vehicle shaft at a lower portion, left and right side panels that form left and right sides of the vehicle body, a roof panel that forms an upper surface, a cowl plate, a package tray, and a roof rail. Additionally, a capacity requirement planning (CRP) component designates a position of a cowl plate, a roof rail, and a package tray, and includes a process where a loading robot loads the components in a predetermined loading jig, a separate setting robot disposes and welds the components disposed in the loading jig in a predetermined position of the vehicle body.

Further, a various vehicle type response assembly system that assembles vehicle body components in various types of vehicles has been applied to a process for assembling vehicle body components. However, many various vehicle type response assembly systems have a difficulty in flexibly dealing with assembling vehicle body components based on a change in vehicle type. As described above, when assembling the vehicle body components, a loading jig that supports an assembly component is used, a mobile robot supplies the assembly component to the loading jig and then releases the assembly component from the loading jig.

Meanwhile, a waiting time may be increased due to replacement of a jig device and a mobile robot based on the variety of the vehicle body components (e.g., change components based on varied vehicle types). Efficiency of system operation including a long cycle time may also be deteriorated. When a public device is prepared, a structure of the entire device is complex and thus, an initial investment cost of the device may be increased.

The above information disclosed in this section is merely for enhancement of understanding of the background of the invention and therefore it may contain information that does not form the prior art that is already known in this country to a person of ordinary skill in the art.

SUMMARY

The present invention provides a robot transferring system of a component and a transferring method thereof having advantages of more accurately transferring and welding CRP components optionally disposed in a hanger to a vehicle body while more accurately capturing the CRP components.

An exemplary embodiment of the present invention provides a robot transferring system of a component that may include: a hanger in which components including at least one of a cowl plate, a roof rail, and a package tray are disposed; a first vision configured to detect a reference position of the components disposed in the hanger to detect a disposed shape of the component; a first loading robot configured to capture (e.g., determine) a predetermined position of the component detected from the first vision; a first loading jig disposed at a location in which one of the components captured by the loading robot is configured; and a setting robot configured to transfer the components disposed in the loading jig to a vehicle body while capturing one of the components and to locate the component to a predetermined position of the vehicle body.

The hanger may include a rear hanger being transferred along a rail disposed in a rear side of the vehicle body; and a front hanger being transferred along a rail disposed in a front side of the vehicle body. A cowl plate or a second roof rail may be disposed in the rear hanger, and a first roof rail or a package tray may be disposed in the front hanger. The first loading robot may be disposed in a rear side and a front side of the vehicle body, respectively. The first vision and the second vision may be disposed in a robot arm of the first loading robot and a robot arm of the setting robot and may be configured to detect shapes and disposal characteristics of a corresponding component and the vehicle body.

The robot transferring system of a component may further include: a second loading jig disposed at a location in which at least one of the components is configured or located; and a second loading robot configured to transfer the components disposed in the second loading jig to the hanger while capturing at least one of the components. The robot transferring system of a component may further include: a third loading robot configured to load the at least one of the components in the second loading jig. Additionally, the robot transferring system of a component may include a plurality of racks in which the at least one of the components is disposed. The third loading robot may be configured to move along a rail to transfer the components disposed in the racks to the second loading jig while capturing at least one of the components.

The first vision may detect an aperture formed in the components to form a real coordination system using the detected aperture, and may be configured to detect positions of the components using a difference between the real coordination system and a predetermined reference coordination system. The second vision may be configured to detect a real inflection point of a predetermined position and a real shape of the vehicle body with which the components are disposed and assembled, and may be configured to detect a real shape of the vehicle body using a difference between the real inflection point and a predetermined reference inflection point and a difference between the real shape and a predetermined reference shape. The cowl plate may be disposed in the racks and the third loading robot may be configured to load the cowl plate in the second loading jig, and the second roof rail and the first roof rail may be loaded in the second loading jig by a worker.

Another exemplary embodiment of the present invention provides a robot transferring method of a component that may include: loading a predetermined component in a loading jig; loading the component loaded in the loading jig in a hanger; capturing the component loaded in the hanger;

loading the component disposed in the hanger in an arrangement jig while catching one side of the component disposed in the hanger; determining a predetermined position of a vehicle body in which a component loaded in the arrangement jig is mounted by a vision (e.g., a sensor); and transferring the component loaded in the arrangement jig to a mounted position of the vehicle body while catching one side of the component.

The hanger may include a rear hanger and a front hanger, the rear hanger may be transferred along a rail disposed in a rear side of the vehicle body, and the front hanger may be transferred along a rail disposed in a front side of the vehicle body. The vision (e.g., sensor) may be configured to detect an aperture formed in the component to form a real coordination system using the detected aperture, and may be configured to detect locations of the components using a difference between the real coordination system and a predetermined reference coordination system. The vision may further be configured to detect a real inflection point of a predetermined position and a real shape of the vehicle body with which the components are disposed and welded, and detect a real shape of the vehicle body using a difference between the real inflection point and a predetermined inflection point and a difference between a real shape and a predetermined reference shape. The component may include at least one of a cowl plate, a roof rail, and a package tray.

According to the present invention to achieve the above object, since the components may be disposed in the front hanger and the rear hanger without a jig, various shapes of components may be loaded. Further, robots may transfer the components loaded in a hanger while determining an exact position of the components by the vision sensor to be applicable to a various vehicle type production system. In addition, a real shape of the vehicle body may be detected, and the components may be assembled in an exact position corresponding to a real shape of the vehicle body.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DESCRIPTION OF SYMBOLS

Figure 1:
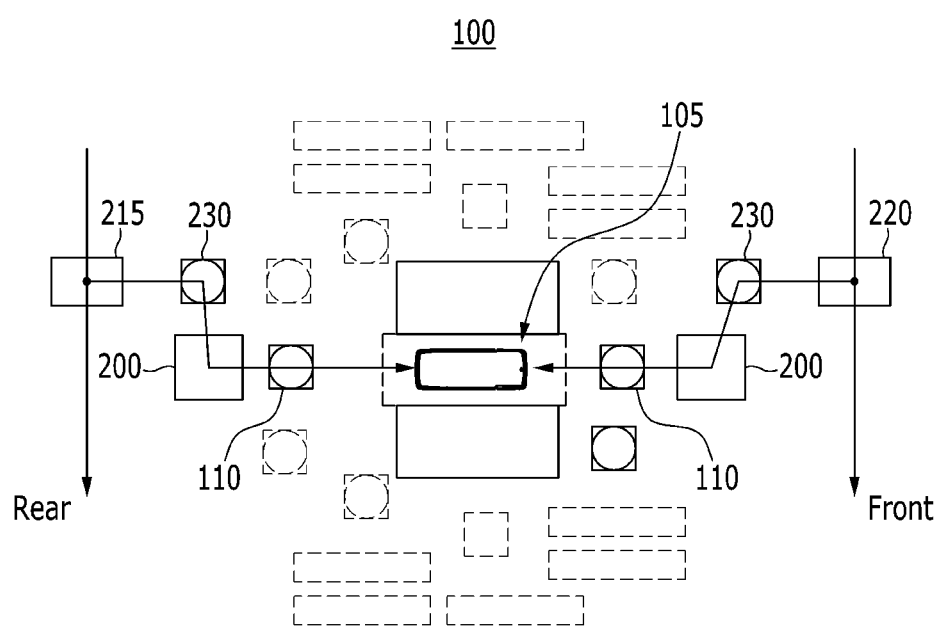
FIG. 1 is a schematic diagram illustrating a part of a robot transferring system of a CRP component according to an exemplary embodiment of the present invention.

100: main deck
110: setting robot
105: vehicle body
200: first loading jig
202: second loading jig
305: first roof rail
310: second roof rail
210a: rear rail
210b: front rail
215: rear hanger
220: front hanger
225: rack
230: first loading robot
234: third loading robot
232: second loading robot
232a: rear loading robot
232b: front loading robot
300: cowl plate
315: package tray
400: sensor
410: controller
510: real coordination system
500: reference coordination system
600: reference shape
610: real shape
612: real inflection point
602: reference inflection point

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to accompanying drawings. Further, the size and thickness of each configuration shown in the drawings are optionally illustrated for better understanding and ease of description, the present invention is not limited to shown drawings and the thickness of layers, films, panels, regions, etc., are exaggerated for clarity. Accordingly, the drawings and description are to be regarded as illustrative in nature and not restrictive. Like reference numerals designate like elements throughout the specification. It will be understood that, although the terms first and second etc. may be used herein to describe various elements, these elements should not be limited by these terms. These terms are used to distinguish one element from another.

FIG. 1 is a schematic diagram illustrating a part of a robot transferring system of a CRP component according to an exemplary embodiment of the present invention. Referring to FIG. 1, the robot transferring system may include a main deck 100 with which a vehicle body is assembled and welded. The main deck 100 may include a rear hanger 215, a front hanger 220, a first loading robot 230, a first loading jig 200, a setting robot 110, and a vehicle body 105. The system to be described herein below may be operated by a controller having a processor and a memory.

The rear hanger 215 may be disposed at rear side based on the vehicle body 105 to be moved along a rail. The front hanger 220 may be disposed at a front side to be moved along the rail. That is the rear hanger and the front hanger are disposed respectively at the rear and front of a vehicle body. The first loading robot 230 may be configured to load at least one of components loaded in the rear hanger 215 or the front hanger 220 in the first loading jig 200 while catching or capturing the at least one component. In other words, the first loading robot 230 may be configured to grasp the component that has been loaded in one of the hangers and load the component into the first loading jig 200. The setting robot 110 may be configured to transfer a component loaded in the first loading jig 200 to a side of the vehicle body 105 while catching or capturing (e.g., grasping, holding, etc.) the loaded component.

A first vision may be disposed in the first loading robot 230. In particular, the vision may be a sensor configured to capture various information such as position coordinates, shapes, sizes, and the like. The first vision may be configured to capture information regarding the components disposed in the rear hanger 215 or the front hanger 220, respectively, and the first loading robot 230 may be thus be configured to determine an exaction position of the components based on data received from the first vision. That is, the sensor may be configured to transmit gather component information to the first loading robot 230.

Further, the first loading robot 230 may be configured to load the captured component in the first loading jig 200. A second vision (e.g., a sensor) may be disposed in the setting robot 110. The second vision may be configured to detect a real shape of a part in the vehicle body 105 with which a component is assembled. Accordingly, the setting robot 110 may be configured to grasp the component and assemble the component disposed in the first loading jig 200 at an accurate position that corresponds to a real shape of the vehicle body. Further, a welding device (not shown) may enter in a vehicle body to weld the assembled component with the vehicle body 105.

Figure 2:
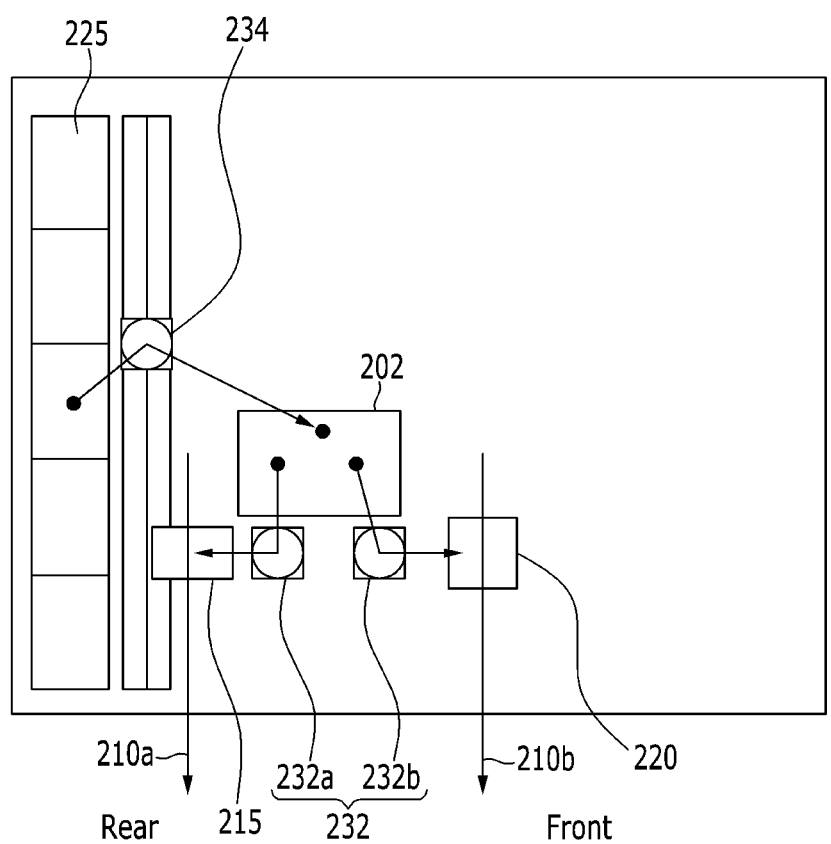
FIG. 2 is a schematic diagram illustrating a part of a robot transferring system of a CRP component according to an exemplary embodiment of the present invention.

FIG. 2 is a schematic diagram illustrating a part of a robot transferring system of a CRP component according to an exemplary embodiment of the present invention. Referring to FIG. 2, the robot transferring system may include a rack 225, a third loading robot 234, a second loading jig 202, a second loading robot 232, a rear hanger 215, a front hanger 220, a rear rail 210a, and a front rail 210b as constituent elements, and the second loading robot 232 may include a rear loading robot 232a and a front loading robot 232b. The system may generally be operated by a controller having a processor and memory. That is, the various robots may be controlled by a control signal received from the controller.

The rack 225 may be arranged in a predetermined direction, a rail may be disposed at a side of the rack 225, and a third loading robot 234 may be movably disposed on the rail. A second loading jig 202 may be disposed at one side (e.g., a first side) of the third loading robot 234, and a rear loading robot 232a and a front loading robot 232b may be disposed at one side (e.g., a first side) of the second loading jig 202, respectively. Further, a rear hanger 215 may be disposed at one side (e.g., a first side) of the rear loading robot 232a to be moved along a real rail 210a. A front hanger 220 may be disposed at one side (e.g., a first side) of the front loading robot 232b to be moved along the front rail 210b.

According to predetermined order data (e.g., the sequential order), the third loading robot 234 may be configured to load components disposed in the rack 225 into the second loading jig 202. Moreover, a worker may manually load other components in the second loading jig 202. For example, a package tray 315 may be loaded from the rack 225 to the second loading jig 202 by the third loading robot 234. A roof rail and a cowl plate 300 (e.g., other components) may be loaded into the second loading jig 202 by a worker.

A cowl plate 300 and a second roof rail 310 disposed in the second loading jig 202 may be loaded in the rear hanger 215 by the rear loading robot 232a. The first roof rail 305 and the package tray 315 may be loaded in the front hanger 220 by the front loading robot 232b. Alternatively, a first roof rail 305 and a package tray 315 disposed in the second loading jig 202 may be loaded in the rear hanger 215 by the rear loading robot 232a. A cowl plate 300 and a second roof rail 310 may then be loaded in the front hanger 220 by the front loading robot 232b.

Moreover, the rear hanger 215 in which a component is loaded may be moved along a rear rail 210a, the front hanger 220 may be moved along a front rail 210b, and loaded components may then be loaded in the first loading jig 200 by a first loading robot 230 of FIG. 1. In an exemplary embodiment of the present invention, a detailed description of a function and a structure of a roof rail, a cowl plate, and a package tray is omitted with reference to a disclosed technology.

Figure 3:
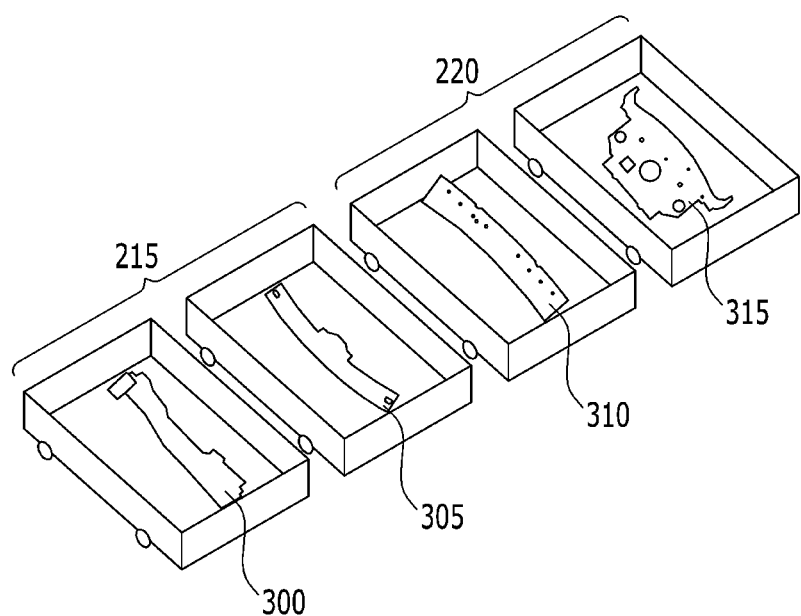
FIG. 3 is a perspective view illustrating a state that a CRP component according to an exemplary embodiment of the present invention is disposed in a hanger.

FIG. 3 is a perspective view illustrating a state that a CRP component according to an exemplary embodiment of the present invention is disposed in a hanger. Referring to FIG. 3, two rear hangers 215 are provided. A cowl plate 300 and a first roof rail 305 may be disposed in each of the rear hangers 215. Further, two front hangers 220 may be provided. A package tray 315 and a second roof rail 310 may be disposed in each of the front hangers 220. Since components are optionally disposed in the front hanger 220 and the rear hanger 215 without a jig, various types of components may be loaded without limitation as to shape and size. Further, robots may be moved while determining an accurate position of a loaded component using a vision 400 (e.g., the sensor). Through the above configuration, a various vehicle type production system is applicable.

Figure 4:
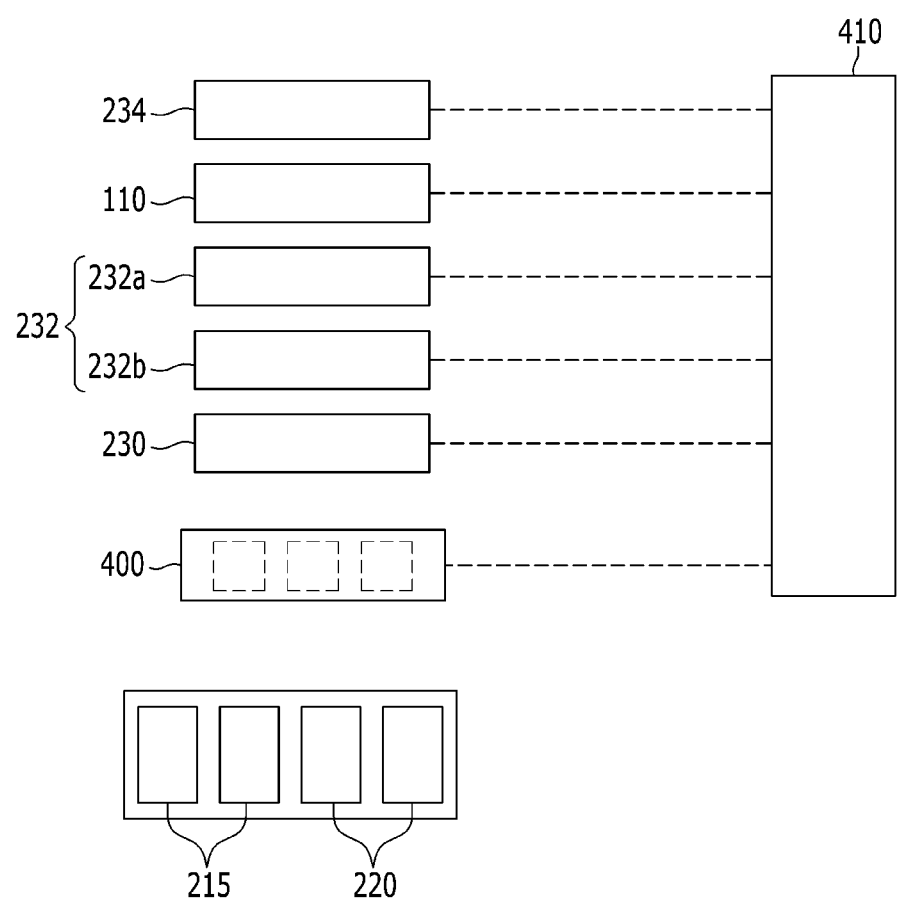
FIG. 4 is a schematic diagram illustrating the whole configuration of a robot transferring system of a CRP component according to an exemplary embodiment of the present invention.

FIG. 4 is a schematic diagram illustrating the whole configuration of a robot transferring system of a CRP component according to an exemplary embodiment of the present invention. Referring to FIG. 4, the robot transferring system may include a controller 410, a first loading robot 230, a second loading robot 232, a third loading robot 234, a setting robot 110, a sensor 400 (e.g., a vision), a rear hanger 215, and a front hanger 220 as constituent elements. In some embodiments, the sensor may be configured to as a camera to capture (e.g., shoot) an image of the components and detect a shape of the component using well known image analysis.

Particularly, the second loading robot 232 may include a rear loading robot 232a and a front loading robot 232b. The controller 410 may be configured to operate the third loading robot 234, the second loading robot 232, the first loading robot 230, and the setting robot 110 based on a supply order of a predetermined component, and detect real shapes of a component and a vehicle body from the sensor 400 to transfer the component to an accurate position of the vehicle body while determining an exact position of the component. The controller 410 may be configured by at least one processor operated according to a preset program. The preset program may include a series of commands for performing respective steps of a method of operating a compressor of a vehicle according to an exemplary embodiment of the present invention.

Figure 5:
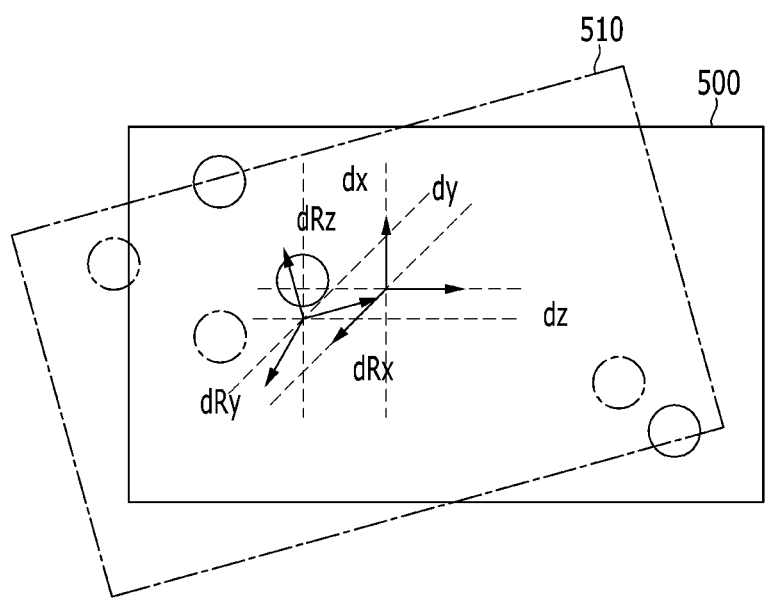
FIG. 5 is a table illustrating a coordination system for detecting a CRP component according to an exemplary embodiment of the present invention.

FIG. 5 is a table illustrating a coordination system for shooting a CRP component according to an exemplary embodiment of the present invention. Referring to FIG. 5, a coordination system may include a reference coordination system 500 and a real coordination system 510. The reference coordination system 500 may be predetermined data, and the real coordination system 510 is data generated based on a predetermined aperture formed in a component using the sensor 400. The controller 410 may be configured to acquire a real coordination system 510 using the aperture of a component detected using the sensor 400, and may be configured to transfer the component to a predetermined position while determining a predetermined position of the component.

Figure 6:
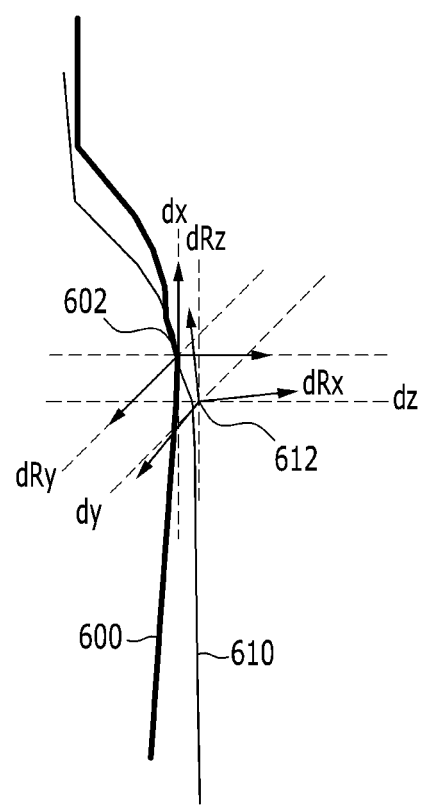
FIG. 6 is a schematic cross-sectional view illustrating a coordination system for capturing a vehicle body in which a CRP component is assembled according to an exemplary embodiment of the present invention.

FIG. 6 is a schematic cross-sectional view illustrating a coordination system for capturing a vehicle body in which a CRP component is assembled according to an exemplary embodiment of the present invention. Referring to FIG. 6, a reference inflection point 602 and a real inflection point 612 are formed at one side of the vehicle, and the vehicle body 105 includes a reference shape 600 and a real shape 610.

The reference inflection point 602 and the real inflection point 612 may be predetermined virtual data, and the real inflection point 612 and the real shape 610 may be generated by data captured by the sensor 400. An exemplary embodiment of the present invention may move and assemble a component to a predetermined position of a vehicle body using the real inflection point 612 and the real shape 610 captured by the sensor 400.

Figure 7:
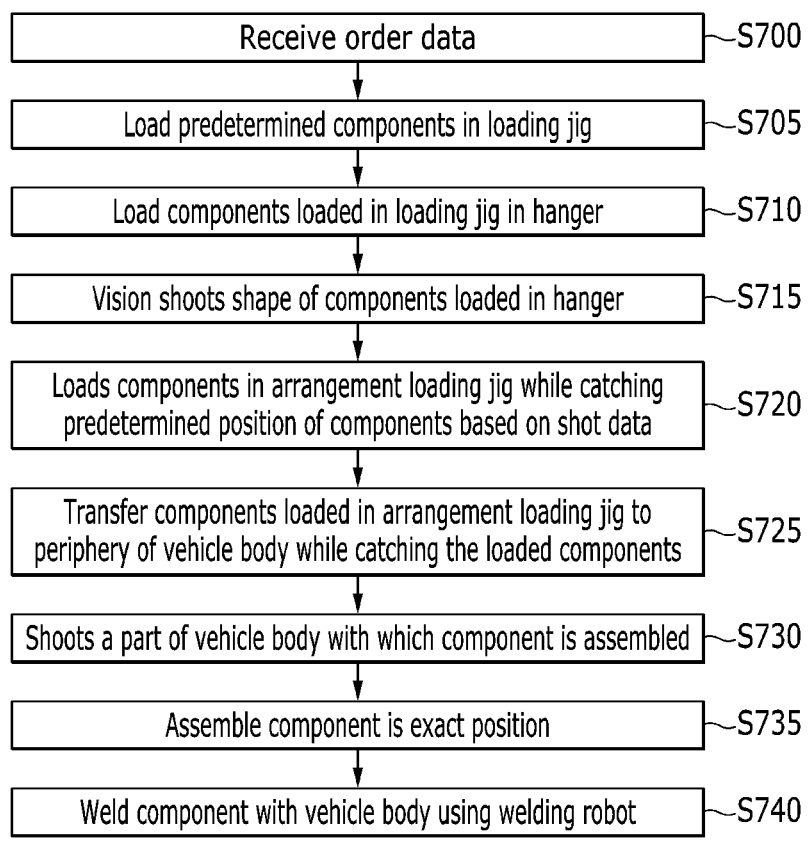
FIG. 7 is a flowchart illustrating a robot transferring method of a CRP component according to an exemplary embodiment of the present invention.

FIG. 7 is a flowchart illustrating a robot transferring method of a CRP component according to an exemplary embodiment of the present invention. Referring to FIG. 7, the transferring method may be configured to receive predetermined order or sequence data at step S700, and load predetermined components (at least one of a cowl plate, a first roof rail, a second roof rail, and a package tray) in the second loading jig at step S705.

At step S710, the second loading robot may be configured to load the components loaded in the second loading jig in a front hanger or a rear hanger. At step S715, the sensor may be configured to capture or detect a shape of the components loaded in the front hanger or the rear hanger, and at step S720, the first loading robot may be configured to load the components in first loading jig (an arrangement jig in the drawing) while determining predetermined position of the components based on the captured data from the sensor.

At step S725, the setting robot may be configured to transfer the components loaded in the first loading jig to a periphery of the vehicle body (while capturing or grasping the loaded components). At S730, the sensor may be configured to detect (or capture an image of) a part of the vehicle body with which the component is assembled. At step S735, the sensor may be configured to determine the exact position of the component corresponding to a real shape of the vehicle body. Thus, the component may be moved to that exact position. At step S740, the vehicle body may be manufactured by welding the component with the vehicle body using a welding robot (not shown). The robot may then return to an initial position.

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A robot transferring system of a component, comprising:
    a hanger in which components including at least one of a cowl plate, a roof rail, and a package tray are disposed;
    a first sensor configured to detect a reference position of the components disposed in the hanger to detect a shape of each component;
    a first loading robot configured to capture each component at a predetermined position detected from the first sensor;
    a first loading jig disposed at a location in which one of the components captured by the loading robot is disposed; and
    a setting robot configured to transfer the components disposed in the loading jig to a vehicle body and to dispose the component to a predetermined position of the vehicle body,
    wherein a second sensor is mounted in the setting robot, wherein the second sensor is configured to detect a real inflection point of a predetermined position and a real shape of the vehicle body with which the components are disposed and assembled, and detect a real shape of the vehicle body using a difference between the real inflection point and a predetermined reference inflection point and a difference between the real shape and a predetermined reference shape, and wherein the first sensor is configured to detect an aperture formed in each component to generate a real coordination system using the detected aperture, and detect positions of the components using a difference between the real coordination system and a predetermined reference coordination system.

2. The robot transferring system of a component of claim 1, wherein the hanger includes:

a rear hanger being transferred along a rail disposed in a rear side of the vehicle body; and a front hanger being transferred along a rail disposed in a front side of the vehicle body.

3. The robot transferring system of a component of claim 2, wherein the cowl plate or a second roof rail are disposed in the rear hanger, and a first roof rail or the package tray are disposed in the front hanger.

4. The robot transferring system of a component of claim 1, wherein the first loading robot is disposed at a rear side of the vehicle body and another first loading robot is disposed at a front side of the vehicle body.

5. The robot transferring system of a component of claim 4, wherein the first sensor is disposed in a robot arm of the first loading robot.

6. The robot transferring system of a component of claim 1, further comprising:

a second loading jig disposed at a location in which at least one of the components is disposed; and a second loading robot configured to transfer the components disposed in the second loading jig to the hanger.

7. The robot transferring system of a component of claim 6, further comprising:

a third loading robot configured to load the at least one of the components in the second loading jig.

8. The robot transferring system of a component of claim 7, further comprising:

a plurality of racks in which the at least one of the components is disposed, wherein the third loading robot is configured to move along a rail to transfer the components disposed in the racks to the second loading jig while grasping at least one of the components.

9. The robot transferring system of a component of claim 8, wherein the cowl plate is disposed in the racks, the third loading robot is configured to load the cowl plate in the second loading jig, and a second roof rail and a first roof rail are loaded in the second loading jig manually.

10. A robot transferring method of a component, comprising:

loading, by a controller, a predetermined component in a loading jig;

loading, by the controller, the component loaded in the loading jig in a hanger;

capturing, by the controller, the component loaded in the hanger;

loading, by the controller, the component disposed in the hanger in an arrangement jig;

detecting, by the controller, a predetermined position of a vehicle body in which a component loaded in the arrangement jig is mounted using a first sensor; and transferring, by the controller using a setting robot, the component loaded in the arrangement jig to a mounted position of the vehicle body, wherein a second sensor is mounted in the setting robot, wherein the second sensor is configured to detect a real inflection point of a predetermined position and a real shape of the vehicle body with which the components are disposed and welded, and detect a real shape of the vehicle body using a difference between the real inflection point and a predetermined inflection point and a difference between a real shape and a predetermined reference shape, and wherein the first sensor is configured to detect an aperture formed in the component to generate a real coordination system using the detected aperture, and detect positions of the components using a difference between the real coordination system and a predetermined reference coordination system.

11. The method of claim 10, wherein the hanger includes a rear hanger and a front hanger, wherein the rear hanger is transferred along a rail disposed in a rear side of the vehicle body, and the front hanger along is transferred a rail disposed in a front side of the vehicle body.

12. The method of claim 10, wherein the component includes at least one of a cowl plate, a roof rail, and a package tray.

* * * * *